United States Patent [19]

Ochi et al.

[11] Patent Number: 5,225,267
[45] Date of Patent: Jul. 6, 1993

[54] LAMINATED RESIN FILM HAVING A METALLIC APPEARANCE

[75] Inventors: Katsura Ochi; Yasuaki Oonishi; Kazuhisa Kinsen, all of Uozu, Japan

[73] Assignee: Nippon Carbide Kogyo Kabushiki Kaisha, Tokyo, Japan

[21] Appl. No.: 752,446
[22] PCT Filed: Jan. 8, 1990
[86] PCT No.: PCT/JP90/00009
 § 371 Date: Sep. 5, 1991
 § 102(e) Date: Sep. 5, 1991
[87] PCT Pub. No.: WO91/10562
 PCT Pub. Date: Jul. 25, 1991
[51] Int. Cl.$^5$ .................. B32B 7/02; B32B 27/08; B32B 15/08
[52] U.S. Cl. .................. 428/214; 428/215; 428/216; 428/336; 428/423.1; 428/424.6; 428/425.8; 428/457
[58] Field of Search ............... 428/458, 461, 203, 336, 428/423.1, 424.6, 425.8, 216, 215, 214, 457

[56] References Cited

U.S. PATENT DOCUMENTS

| Re. 28,506 | 8/1975 | Quaintance et al. | 428/203 |
| 3,765,994 | 10/1973 | Quaintance et al. | 428/461 X |
| 4,317,857 | 3/1982 | Kanda et al. | 428/336 |

FOREIGN PATENT DOCUMENTS

| 140965 | 12/1976 | Japan . |
| 58-42627 | 3/1983 | Japan . |
| 157276 | 9/1984 | Japan . |
| 62-55434 | 4/1987 | Japan . |
| 110048 | 5/1988 | Japan . |

OTHER PUBLICATIONS

Derwent Publications Ltd, London, "Manufacture Decorate Board Metallic Gloss Relief Pattern Vacuum Deposit Metal Print Colour Ink Etch Form Intaglio", May 24, 1985, JP-A-60 092832 (Toppan Printing KK).
Derwent Publicatons, Ltd, London, "Sunlight Control Laminate Material Manufacture Coating Substrate Turn Resin Paint Metal Cure Resin Contain React Dilute Photopolymerise Initiate", Dec. 11, 1980, JP-A-55 158962.

Primary Examiner—Thomas J. Herbert, Jr.
Attorney, Agent, or Firm—Sherman & Shalloway

[57] ABSTRACT

A laminated resin film having a metallic appearance comprises:

(a) a polyvinyl chloride type resin film having a total light transmission of at least 30% and a tensile strength at 5% elongation of not higher than 2 kg/cm;

(b) a thin polyurethane type resin layer laminated on one surface of the resin film and having a total light transmission of at least 30% and a tensile strength at 100% elongation within the range of 50 to 550 kg/cm; and (c) a metal layer having a thickness of 50 to 2,000 Å formed and adhering onto the polyurethane type resin layer. The film is useful particularly as a marking film.

24 Claims, 1 Drawing Sheet

LAMINATED RESIN FILM HAVING A METALLIC APPEARANCE

DESCRIPTION

1. Technical Field

The present invention relates to a laminated resin film having a metallic appearance and more particularly to a laminated resin film having a metallic appearance which can impart a beautiful ornament of a metallic tone to a substrate by being affixed on to a desired substrate with an adhesive or a pressure-sensitive adhesive, or by means of thermal lamination or the like.

2. Background Art

Hitherto, as the resin film having a metallic appearance (hereafter, sometimes referred to as a metallic tone film), there have been known, for example, those which are composed of a resin film, such as a polyester type film, an acrylic type film, a polyvinyl chloride type film or the like, on one surface of which is formed a thin metal layer by a process of deposition, sputtering or the like, and they are used mainly for ornamental purposes and the like.

In the case of metallic tone films prepared using a polyester resin film as the resin film, although generally bonding between the metal layer and the polyester film is relatively good, they have disadvantages that the polyester resin is unsuitable for exterior use since it has a poor weatherability, and the polyester resin film is very hard and hence it has a poor ability to follow curved surfaces, resulting in that it cannot be affixed onto curved surfaces.

Also, in the case of metallic tone films prepared using an acrylic resin film, the acrylic resin has a special character that it has a tendency of losing flexibility with an increased solvent resistance, and hence it is impossible to obtain therefrom metallic tone films which are excellent in both printability (solvent resistance) and flexibility.

Further, in the case of metallic tone films for exterior use prepared using a polyvinyl chloride type resin film, the films can be imparted with weatherability, flexibility and solvent resistance by adjusting their formulation in various ways to modify the properties thereof. However, in this case, generally bonding to the metal layer is difficult to be obtained and for this reason there arises a problem that peeling off of the metal layer occurs, especially when used in the open air, or some other problem. In addition, when used in the open air, it happens that the metal layer is corroded and deteriorated with hydrochloric acid which is formed because of deterioration of the polyvinyl chloride resin, resulting in failure to give metallic tone films for exterior use having good weatherabilities under the present conditions.

On the other hand, there have been made several approaches for obviating the aforementioned defects involved in the use of the polyvinyl chloride type resin films.

For example, Japanese Patent Application Laid-Open No. Sho-58-2627 discloses a method of metal deposition for polyvinyl chloride resin articles which comprises providing on a surface of a polyvinyl chloride resin article a cured film layer of a cationically polymerizable resin composition which cures by irradiation of an actinic radiation, and practicing metal deposition on a surface of the film. Japanese Patent Application Laid-Open No. Sho-5-140965 discloses a primer composition for metal vacuum deposition which contains an aminoalkylsilane and a film-forming resin.

However, no consideration was made at all about weatherability in the above-proposed method and composition because both of them were not designed for exterior use. Also, because no consideration was made about printability, the metallic tone film prepared according to the above proposal has a defect that fine cracks occur in the metal layer when an ink clearer or the like is printed on the surface resin layer and it is then dried. Presumably, this occurs because the metal layer cannot completely follow the deformation of the resin layer due to heat or the like when heated for drying.

Also, in the case where metallic tone films for exterior use are fabricated which have an intermediate binding layer between a surface resin layer and a metal layer, especially where a flexible resin is used in the surface resin layer, the surface resin layer undergoes elongation or deformation due to tension or heat applied thereto or due to solvents which adhere thereto during the procedures in which the intermediate binding layer and the metal layer are bonded, resulting in the occurrence of cracks in the metal layer or sometimes in the breakage of the surface resin layer. Therefore, there arises a problem that it is difficult to fabricate metallic tone films for exterior use stably.

Accordingly, it is an object of the present invention to provide a metallic tone film based on a polyvinyl chloride type resin film which has an excellent integrity of the polyvinyl chloride type resin film and the metal layer, suffers no corrosion and deterioration in the metal layer, exhibits a sufficient weatherability even when used for exterior use, has a flexibility enough to be affixed onto curved surfaces, excellent in various performances such as solvent resistance, warm water resistance, and chemical resistance, and enables various types of beautiful printing.

DISCLOSURE OF INVENTION

The present invention provides a laminated resin film having a metallic appearance, comprising:

(a) a polyvinyl chloride type resin film having a total light transmission of at least 30% and a tensile strength at 5% elongation of not higher than 2 kg/cm;

(b) a thin polyurethane type resin layer laminated on one surface of the resin film and having a total light transmission of at least 30% and a tensile strength at 100% elongation within the range of 50 to 550 kg/cm; and (c) a metal layer having a thickness of 50 to 2,000 Å formed and adhering onto the polyurethane type resin layer.

The present invention provides a laminated resin film having a metallic appearance, further comprising:

(d) an acrylic type resin layer on the metal layer of the laminated resin film.

Hereafter, the laminated resin film of the present invention will be explained in more detail.

Polyvinyl Chloride Type Resin Film (a)

When used as the base of the laminated resin film of the present invention and affixed to a substrate for ornamental use, the polyvinyl chloride type resin film (a) serving as the surface resin layer must have a transparency enough to transmit therethrough and enable one to see the metallic luster feeling of the metal layer bonded through the polyurethane type resin layer described later on; it has a total visible light transmission of at least 30%, preferably not lower than 40%, and more preferably not lower than 50%.

Also, it is desirable that the polyvinyl chloride type resin film (a) have a flexibility enough to enable it to follow the surface of a substrate to which it is affixed even when the surface is irregular, and therefore the resin film (a) should have a tensile strength at 5% elongation within the range of no higher than 2 kg/cm, preferably 1.9 to 0.2 kg/cm, and more preferably 1.8 to 0.4 kg/cm.

Further, the thickness of the polyvinyl chloride type resin film (a) is not limited strictly but can be varied depending on the purpose for which the laminated resin film of the present invention is used. It is convenient that the thickness is within the range of generally 20 to 200 microns, preferably 25 to 170 microns, and more preferably 30 to 150 microns.

The polyvinyl chloride type resin used for forming the resin film (a) having the aforementioned characteristics includes homopolymers of vinyl chloride or copolymers composed of vinyl chloride as a main component and one or more other monomers copolymerizable therewith, having a molecular weight within the range of about 300 to about 3,000, preferably about 350 to about 2,500, and more preferably about 400 to about 2,000, to which a plasticizer, one or more other resins for modification, and the like are optionally blended so that the aforementioned physical properties can be satisfied.

As the monomer copolymerizable with vinyl chloride, there can be cited olefin type monomers such as, for example, ethylene, propylene, butylene, isobutylene, etc.; dienes and vinylacetylene derivatives such as, for example, butadiene, chlorobutadiene, pentadiene; halogenated vinyl monomers such as, for example, vinyl fluoride, vinylidene chloride, vinyl bromide, etc.; (meth)acrylic acid ester monomers such as, for example, ethyl acrylate, butyl acrylate, 2-hydroxyethyl acrylate, 2-ethylhexyl acrylate, methyl methacrylate, butyl methacrylate, butyl methacrylate, propyl methacrylate, ethylene glycol dimethacrylate, etc.; vinyl ester monomers such as, for example, vinyl acetate, vinyl chloroacetate, vinyl propionate, vinyl laurate, etc.; vinyl ether monomers such as, for example, methyl vinyl ether, propyl vinyl ether, butyl vinyl ether, phenyl vinyl ether, allyl vinyl ether, etc.; styrene, methylstyrene, dimethylstyrene, vinylstyrene, chlorostyrene, vinylphenol, etc. They may be used singly or two or more of them may be used in combination. It is preferred that in the copolymer, vinyl chloride occupies at least 70% by mole, preferably not less than 80% by mole, and more preferably not less than 90% by mole, and the remainder is the aforementioned copolymerizable monomer.

As the plasticizer which can be blended, there can be used also those which are usually used in polyvinyl chloride resins. There can be cited, for example, liquid polyester type plasticizers derived from a $C_4$–$C_{15}$ dibasic acid and a $C_2$–$C_{20}$ dihydric alcohol. Specific examples of such a liquid polyester type plasticizer include liquid polyester plasticizers obtained by reacting one to three kinds of dibasic acids selected from among $C_4$ –$C_{15}$ dibasic acids such as maleic acid, adipic acid, phthalic acid, azelaic acid, sebacic acid, etc. with one to five kinds of dihydric alcohols selected from among $C_2$ –$C_{20}$ dihydric alcohols such as ethylene glycol, 1,2-propylene glycol, 1,3-butylene glycol, neopentyl glycol, dipropyl glycol, 1,6-hexanediol, 2,2,4-trimethyl-1,3-pentanediol, 1,5-pentanediol, etc., and a chain stopper properly selected from, for example, acetic acid, coconut oil fatty acid, n-octyl alcohol, and n-decyl alcohol. Such liquid polyester plasticizers may be used singly or two or more of them may be used in combination.

Examples of other plasticizers for vinyl chloride resins include phthalic acid derivatives, for example, dimethyl phthalate, diethyl phathalate, dibutyl phthalate, di-(2-ethylhexyl)phthalate, di-n-octyl phthalate, higher alcohol phthalates, diisooctyl phthalate, diisobutyl phthalate, dipentyl phthalate, diisodecyl phthalate, ditridecyl phthalate, diundecyl phthalate, di-(heptylnonylundecyl) phthalate, benzyl phthalate, butylbenzyl phthalate, dinoyl phthalate, di-n-alkyl phthalates, di-n-isoalkyl phthalates, etc.; isophthalic acid derivatives, for example, dimethyl isophthalate, di(2-ethylhexyl) isophthalate, diisooctyl isophthalate, etc.; tetrahydrophthalic acid derivatives, for example, di-(2-ethylhexyl) tetrahydrophthalate, di-n-octyl tetrahydrophthalate, diisodecyl tetrahydrophthalate, $C_7$ –$C_{10}$ alkyl tetrahydrophthalate, etc.; adipic acid derivatives, for example, di-n-butyl adipate, di-(2-ethylhexyl) adipate, diisodecyl adipate, benzyloctyl adipate, di-(butoxyethoxyethyl) adipate; azelaic acid derivatives, for example, di-(2-ethylhexyl)azelate, diisooctyl acelate, di-2-ethylhexyl 4-thioazelate; sebacic acid derivatives, for example, di-n-butyl sebacate, di(2-ethylhexyl) sebacate, etc.; maleic acid derivatives, for example, di-n-butyl maleate, dimethyl maleate, diethyl maleate, etc.; fumaric acid derivatives, for example, di-n-butyl fumarate, di-(2-ethylhexyl) fumarate, etc.; trimellitic acid derivatives, for example, tri-(2-ethylhexyl) trimellitate, tri-n-octyl trimellitate, triisodecyl trimellitate, etc.; citric acid derivatives, for example, triethyl citrate, tri-n-butyl citrate, acetyl triethyl citrate, etc., itaconic acid derivatives, for example, monomethyl itaconate, monobutyl itaconate, dimethyl itaconate, etc.; oleic acid derivatives, for example, butyl oleate, tetrahydrofurfuryl oleate, glyceryl monooleate, etc.; ricinolic acid derivatives, for example, methyl acetyl acetyl ricinolate, butyl acetyl ricinolate, glyceryl monoricinolate, etc.; stearic acid derivatives, for example, n-butyl stearate, glyceryl monostearate, diethylene glycol distearate, etc.; in addition, diethylene glycol monolaurate, benzenesulfone butyramide, trimethyl phosphate, tributoxyethyl phosphate, tetra-2-ethylhexyl pyromellitate, diethylene glycol dibenzoate, glycerol monoacetate chlorinated paraffin, epoxy derivatives having an oxirane oxygen content of 2 to 9% and a molecular weight of no higher than 1,000, etc. They can be used in an amount within the range of generally 1 to 100% by weight, preferably 1.5 to 70% by weight, and more preferably 20 to 50% by weight based on total weight of the polyvinyl chloride type resin.

Further, as the resin for modification there can be cited, for example, ethylene/vinyl ester type resins, acrylic type resins, urethane type resins, polyester type resins, etc. These may be used in an amount within the range of generally 0.1 to 70% by weight, preferably 0.5 to 60% by weight, and more preferably 1 to 50% by weight based on total weight of the polyvinyl chloride type resin.

The polyvinyl chloride type resin may if desired be blended with any additive known per se and usually used for polyvinyl chloride resins, for example, stabilizers such as, for example, calcium zinc type stabilizer (CZ-19J, produced by Katsuta Kako Co., Ltd.), tin type stabilizer (181 FSJ, produced by Katsuta Kako Co., Ltd.), barium zinc type stabilizer (BZ51J, produced by Katsuta Kako Co., Ltd.), and lead stearate type stabilizer (Pb-St, produced by Kosei Co., Ltd.); antioxidants such as, for example, monophenol type antioxidant (Yoshinox BHT, produced by Yoshitomi Pharmaceutical Co., Ltd.), amine type antioxidant (Yoshinox EQ, produced by Yoshitomi Pharmaceutical Co., Ltd.), and polyphenol type antioxidant (Ilganox 1010, produced by Ciba-Geigy); lubricants such as, for example, hydrocarbon type lubricant (Ac-6A, produced by Allied Chemical), fatty acid type lubricant (F-3, produced by Kawaken Fine Chemicals), fatty acid ester type lubricant (Hoechst waxoop, produced by Hoechst Japan), and aliphatic alcohol type lubricant (Alcohol 86, produced by Kao Soap); for example, phthalic acid type plasticizer (DOP, produced by Sanken Kako Co., Ltd.); ultraviolet light absorbents such as, for example, benzotriazole type ultraviolet light absorbent (Tinubin P, Tinubin 326, 327, produced by Ciba-Geigy), and hydroxybenzophenone type ultraviolet light absorbent (Cyasoap UV-9, produced by American Cyanamide) in amounts usually used.

As the polyvinyl chloride type resin which can be used suitably in the present invention, there can be cited, a semi-hard polyvinyl chloride resin composition disclosed in Japanese Patent Application Laid-Open No. Sho-60-195146, having a stress at yield within the range of 1 to 6 kg./cm$^2$ and having the following composition:

(A) 100 parts by weight of a polyvinyl chloride which may contain no more than 20% by weight of a copolymerization component;

(B) 1 to 20 parts by weight of a liquid polyester type plasticizer having a number average molecular weight (Mn) of no lower than 1,500 and 0 to 10 parts by weight of another plasticizer for polyvinyl chloride resins; and (C) 5 to 20 parts by weight of an ethylene/vinyl ester copolymer; and a semi-hard polyvinyl chloride resin composition disclosed in Japanese Patent Publication No. Sho-63-24619 (U.S. Pat. No. 4,670,490 specification), having a stress at yield within the range of 1 to 5 kg/cm$^2$ and having the following composition:

(A) 100 parts by weight of a polyvinyl chloride which may contain no more than 20% by weight of a copolymerization component;

(B) 10 to 80 parts by weight of a liquid polyester type plasticizer having a number average molecular weight (Mn) of no lower than 1,500 and 0 to 10 parts by weight of another plasticizer for polyvinyl chloride resins; and (C) a low molecular weight (meth)acrylic type resin having a number average molecular weight (Mn) within the range of 1,500 to 5,000 and being solid at 23° C. in an amount of 0.2 to 200% by weight based on total amount of the aforementioned plasticizers (B).

As more preferred polyvinyl chloride type resin which can be used in the present invention, there can be cited a semi-hard polyvinyl chloride resin composition disclosed in Japanese Patent Application Laid-Open No. Sho-60-195147, having a stress at yield within the range of 1 to 6 kg./cm$^2$, preferably 1 to 5 kg/cm$^2$, and more preferably 1.2 to 4.5 kg./cm$^2$, and having the following composition:

(A) 100 parts by weight of polyvinyl chloride which may contain no more than about 20% by weight of a copolymerization component;

(B) 1 to 20 parts by weight of a liquid polyester type plasticizer having a number average molecular weight (Mn) of no lower than 1,500 and 0 to 10 parts by weight of other plasticizer for polyvinyl chloride resins; and (C) ethylene/vinyl ester of a saturated carboxylic acid/carbon monoxide type copolymer in an amount of 45 to 350% by weight based on total amount of the aforementioned plasticizers (B).

Hereafter, the preferred semi-hard polyvinyl chloride resin composition will be described in more detail.

No particular limitation is posed on the polyvinyl chloride (A) used in the aforementioned semi-hard polyvinyl chloride resin composition and any polyvinyl chloride resin that has hitherto been used for molding can be used. For example, there can be exemplified a polyvinyl chloride having a degree of polymerization of about 600 to about 3,000, preferably about 700 to about 2,000, more preferably about 800 to about 1,800, and particularly preferably about 1,200 to about 1,600.

Further, the aforementioned polyvinyl chloride (A) may be a homopolymer of vinyl chloride or a copolymer containing up to about 20% by weight, preferably up to about 10% by weight, particularly preferably up to about 6% by weight, of a copolymerization component. Examples of such a copolymerization component include vinyl monomers, for example, olefin type monomers such as, for example, ethylene, propylene, butylene, isobutylene, etc.; dienes such as, for example, butadiene, chlorobutadiene, pentadiene, etc. and vinylacetylene derivatives; halogenated vinyl monomers such as, for example, vinyl fluoride, vinylidene chloride vinyl bromide, etc.; (meth)acrylic acid ester monomers such as, for example, ethyl acrylate, butyl acrylate, 2-hydroxyethyl acrylate, 2-ethylhexyl acrylate, methyl methacrylate, butyl methacrylate, butyl methacrylate, propyl methacrylate, ethylene glycol dimethacrylate, etc.; vinyl ester monomers such as, for example, vinyl acetate, vinyl chloroacetate, vinyl propionate, vinyl laurate, etc.; vinyl ether monomers such as, for example, methyl vinyl ether, propyl vinyl ether, butyl vinyl ether, phenyl vinyl ether, allyl vinyl ether, etc.; styrene derivatives such as,,for example, styrene, methyl-styrene, dimethylstyrene, vinylstyrene, chlorostyrene, vinylphenol, etc.

The polyvinyl chloride as described above can be prepared by a known method or commercially available. For example, there can be cited, for example, commercially available vinyl chloride resins such as Zeon 121, Zeon 131, Zeon 25, Zeon 135J (vinyl chloride resins, products by Nippon Zeon Co., Ltd.), Vinica P-440, Vinica P-400 (vinyl chloride resins, products by Mitsubishi Monsanto Co., Ltd.), Sumilit PX (vinyl chloride resin, product by Sumitomo Chemical Co., Ltd.) and the like.

The plasticizers (B) which can be used in the aforementioned semi-hard polyvinyl chloride resin composition comprise 5 to 70 parts by weight, preferably 10 to 60 parts by weight, and more preferably 20 to 50 parts by weight of, a polyester type plasticizer having a number average molecular weight of no lower than about 1,500, preferably about 1,500 to about 6,000, more preferably about 1,500 to about 4,000, and more preferably about 2,000 to about 4,000, and 0 to 10 parts by weight, preferably 2 to 8 parts by weight, and more preferably 3 to 7 parts by weight of other plasticizer for vinyl chloride resins. The parts by weight for the aforementioned plasticizers are based on 100 parts by weight of the aforementioned polyvinyl chloride.

As the liquid polyester type plasticizer, there can be cited, for example, liquid polyester plasticizers obtained by reacting one to three kinds of dibasic acids selected from among $C_4$–$C_{15}$ dibasic acids such as maleic acid, adipic acid, phthalic acid, azelaic acid, sebacic acid, etc. with one to five kinds of dihydric alcohols selected from among $C_2$–$C_{20}$ dihydric alcohols such as ethylene glycol, 1,2-propylene glycol, 1,3-butylene glycol, neopentyl glycol, dipropyl glycol, 1,6-hexanediol, 2,2,4-trimethyl-1,3-pentanediol, 1,5-pentanediol, etc., and a chain stopper properly selected from, for example, acetic acid, coconut oil fatty acid, n-octyl alcohol, and n-decyl alcohol. By the term "liquid" in the expression "liquid polyester plasticizer" is meant a viscous liquid having a viscosity at 25° C. of 500,000 poises or less as measured with a BH type rotational viscometer, and the number average molecular weights of the polyester type plasticizers (Mn) are values measured by GPC (Gel Permeation Chromatography) method and converted.

Such polyester type plasticizers are available as products on the market. There can be cited, for example, PN-150, PN-260, PN-446 (polyester type plasticizers, product by Adeka Argus Chemical Co., Ltd.), NS-3700 (polyester type plasticizer, product by Dainippon Seika Kogyo Co., Ltd.), P-204N, P-29 (polyester type plasticizers, products by Dai-Nippon Ink and Chemicals Co., Ltd.), G-25, G-40 (polyester type plasticizers, products by Rohm & Haas Co.), SP-171, DIDA, SP-501, SP-115S (polyester type plasticizers, products by Sanken Kako Co., Ltd.), Kodaflex NP-10 (polyester type plasticizer, product by Eastman Chemical Products Co.), Flexol P-2H (polyester type plasticizer, product by Union Carbide Corp.), Edenol 1200 (polyester type plasticizer, product by Henkel Co.), Rheoplex 100, Rheoplex 110, Rheoplex 220 (polyester type plasticizers, products by Ciba-Geigy), etc. These polyester type plasticizers may be used singly or two or more of them may be used in combination.

In the aforementioned composition, a small amount, e.g., up to about 10 parts by weight, preferably up to about 5 parts by weight, per 100 parts of the polyvinyl chloride, of other plasticizer for vinyl chloride resins may be used in combination. Examples of such other plasticizer for vinyl chloride resins include the following plasticizers: phthalic acid derivatives, for example, dimethyl phthalate, diethyl phthalate, dibutyl phthalate di-(2-ethylhexyl)phthalate, di-n-octyl phthalate, higher alcohol phthalates, diisooctyl phthalate, diisobutyl phthalate, dipentyl phthalate, diisodecyl phthalate ditridecyl phthalate, diundecyl phthalate, di(heptylnonylundecyl) phthalate, benzyl phthalate, butylbenzyl phthalate, dinonyl phthpalate, di-n-alkyl phthalates, di-n-isoalkyl phthalates, etc.; isophthalic acid derivatives, for example, dimethyl isophthalate, di-(2-ethylhexyl) isophthalate, diisooctyl isophthalate, etc.; tetrahydrophthalic acid derivatives, for example, di-(2-ethylhexyl) tetrahydrophthalate, di-n-octyl tetrahydrophthalate, diisodecyl tetrahydrophthalate, $C_7$–$C_{10}$ alkyl tetrahydrophthalate, etc.; adipic acid derivatives, for example, di-n-butyl adipate, di-(2-ethylhexyl) adipate, diisodecyl adipate, benzyloctyl adipate, di-(butoxyethoxyethyl) adipate; azelaic acid derivatives, for example, di-(2-ethylhexyl)azelate, diisooctyl azelate, di-2-ethylhexyl 4-thioazelate; sebacic acid derivatives, for example, di-n-butyl sebacate, di(2-ethylhexyl) sebacate, etc.; maleic acid derivatives, for example, di-n-butyl maleate, dimethyl maleate, diethyl maleate, etc.; fumaric acid derivatives, for example, di-n-butyl fumarate, di-(2-ethylhexyl) fumarate, etc.; trimellitic acid derivatives, for example, tri-(2-ethylhexyl) trimellitate, tri-n-octyl trimellitate, triisodecyl trimellitate, etc.; citric acid derivatives, for example, triethyl citrate, tri-n-butyl citrate, acetyl triethyl citrate, etc., itaconic acid derivatives, for example, monomethyl itaconate, monobutyl itaconate, dimethyl itaconate, etc.; oleic acid derivatives, for example, butyl oleate, tetrahydrofurfuryl oleate, glyceryl monooleate, etc.; ricinolic acid derivatives, for example, methyl acetyl acetyl ricinolate, butyl acetyl ricinolate, glyceryl monoricinolate, etc.; stearic acid derivatives, for example, n-butyl stearate, glyceryl monostearate, diethylene glycol distearate, etc.; in addition, diethylene glycol monolaurate, benzenesulfone butyramide, trimethyl phosphate, tributoxyethyl phosphate, tetra-2-ethylhexyl pyromellitate, diethylene glycol dibenzoate, glycerol monoacetate chlorinated paraffin, epoxy derivatives having an oxirane oxygen content of 2 to 9% and a molecular weight of no higher than 1,000, etc.

In the aforementioned semi-hard polyvinyl chloride resin composition, ethylene/vinyl ester of a saturated carboxylic acid/carbon monoxide type copolymer (C) in an amount of 45 to 350% by weight, preferably 50 to 300% by weight, and more preferably 55 to 250% by weight, based on total amount of the plasticizers (B), is used together with the polyvinyl chloride (A) and the plasticizers (B).

As the vinyl ester of a saturated carboxylic acid which constitutes the aforementioned copolymer, there can be cited, for example, vinyl esters of saturated aliphatic monocarboxylic acids, e.g., vinyl acetate, vinyl propionate, vinyl butyrate, vinyl versatate, vinyl stearate, etc. Among them, preferred is vinyl acetate.

Proportion of monomers in the copolymer is not limited strictly but may be within the range of 1 to 20% by weight, preferably 2 to 10% by weight, and more preferably 2 to 6% by weight, of ethylene: 1 to 20% by weight, preferably 2 to 10% by weight, and more preferably 2 to 6% by weight, of vinyl ester of a saturated carboxylic acid : 1 to 20% by weight, more preferably 2 to 10% by weight, and more preferably 2 to 6% by weight, of carbon monoxide.

Such copolymers are themselves known per se, and can be prepared by the method described in Japanese Patent Publication No. Sho-55-50063 (=U.S. Pat. No. 3,780,140 specification), and can have a number average molecular weight within the range of generally 600 to 3,000, preferably 700 to 2,000, and more preferably 800 to 1,800. Marketed products, for example, Zone 135J, Zeon 38J (produced by Nippon Zeon Co., Ltd.), etc. can be used.

Further, the aforementioned semi-hard polyvinyl chloride resin composition may contain, if desired: (D) a low molecular weight acrylic type resin having a number average molecular weight of about 1,500 to about 50,000, preferably about 2,000 to about 40,000, and more preferably about 2,500 to about 30,000 and being solid at 23° C. in an amount within the range of up to 20% by weight, preferably about 5 to about 15% by weight, and more preferably about 7 to about 12% by weight based on the polyvinyl chloride (A).

Such a low molecular weight (meth)acrylic type resin can be readily prepared by polymerizing at least one $C_1$–$C_{18}$ alkyl ester of (meth)acrylic acid, if desired, together with one or more other monomers copolymerizable therewith. It is desired that the (meth)acrylic type resin have a glass transition temperature (Tg) of generally not lower than 30° C., preferably not lower than 35° C.

As the method for fabricating films using the polyvinyl chloride type resin as described above, a method which is known per se can be used. For example, a film having a desired thickness can be fabricated by subjecting a solution containing the resin component to casting film forming means such as a cast method or a coater method using a support film as a carrier. Examples of the solvent used on this occasion include tetrahydrofuran, methyl ethyl ketone, methylene chloride, dimethylformamide, alcohols, etc.

According to the above-explained fabricating method, the support film serves as a carrier for fixing respective layers in the metallic tone film in each of the steps described later on and at the same time serves as a protective layer for the surface resin layer, making it possible to fabricate the aforementioned metallic tone film for exterior use with ease and certainty and effectively prevent the surface from being damaged due to external factors in each step.

To note, in the aforementioned fabricating method, a step of forming one or more other layers such as surface coating layer and the like can be added, if required.

Polyurethane Type Resin Layer (b)

As the polyurethane type resin laminated on one surface of the aforementioned polyvinyl chloride type resin film (a), there is used one having a total visible light transmission of at least 30%, preferably not lower than 40%, and more preferably not lower than 50%, and a tensile strength at 100% elongation within the range of 50 to 550 kg/cm$^2$, preferably 60 to 450 kg/cm$^2$, and more preferably 70 to 350 kg/cm$^2$. Its kind is not limited strictly and can be selected from a wide range so far as the aforementioned conditions are met.

As the isocyanate component which can be used in the preparation of the polyurethane resin that can be used in the present invention, there can be employed aliphatic type, alicyclic type, aromatic type or their mixed type polyisocyanate compounds may also be used. More specifically, there can be cited, for example, so-called aromatic multifunctional isocyanates such as 2,4-tolylene diisocyanate, 2,6-tolylene diisocyanate, p-phenylene diisocyanate, 4,4-diphenylmethane diisocyanate, naphthalene, 1,5-diisocyanate, tolidine diisocyanate, xylene diisocyanate, transcyclohexane 1,4-diisocyanate, tetramethylxylene diisocyanate, etc.; pentamethylene diisocyanate, hexamethylene diisocyanate, heptamethylene diisocyanate, 4,4'-dicyclohexylbutane diisocyanate, lysine diisocyanate, isophorone diisocyanate, hydrogenated methylenediphenyl diisocyanate, hydrogenated xylylene diisocyanate, lysine ester triisocyanate, 1,6,11-undecane triisocyanate, 1,8-diisocyanato-4-isocyanatomethyloctane, 1,3,6-hexamethylene triisocyanate, bicycloheptane triisocyanate, trimethylhexamethylene diisocyanate, etc.

Also, there can be cited dimers (uretidiones), trimers (isocyanurates), and modified products such as carbodiimide-modified products, allophanate-modified products, biuret-modified products, urea-modified products, and urethane-modified products, of the aforementioned isocyanate components, or blocked isocyanates thereof. These may be used singly or two or more of them may be used in combination. Particularly, pentamethylene diisocyanate, hexamethylene diisocyanate, heptamethylene diisocyanate, 4,4'-dicyclohexylmethane diisocyanate, lysine diisocynate, isophorone diisocyanate, hydrogenated methylenediphenyl diisocyanate, hydrogenated xylylene diisocyanate, lysine ester triisocyanate, 1,6,11-undecane triisocyanate, 1,8-diisocyanato-4-isocyanatomethyloctane, 1,3,6-hexamethylene triisocyanate, bicycloheptane triisocyanate, trimethylhexamethylene diisocyanate, etc., which are excellent in yellowing resistance, can be used favorably.

On the other hand, as for the polyol component, monomeric or polymeric polyols which have been generally used in the preparation of polyurethanes can also be used. There can be cited monomeric diols such as, for example, ethylene glycol, propylene glycol, butane diol, hexane diol, cyclohexane dimethanol, diethylene glycol, dipropylene glycol, bisphenol, bishydroxyethoxybenzene, neopentyl glycol, triethylene glycol, hydrogenated bisphenol A, etc.; polymeric polyols such as, for example, polyester polyols, polycaprolactone polyols, polyether polyols, polycarbonate polyols, acrylic polyols, butadiene polyols, phenolic polyols, epoxy polyols, etc. Specific examples of the polymeric polyols include polyether diols prepared using water as an initiator, propylene glycol, ethylene glycol, potassium hydroxide or alkylene oxide, polycarbonate diols prepared using 1,6-hexane diol, phosgene, ethylene carbonate and 1,6-hexane diol, and polyethylene adipate prepared by condensation with dehydration of adipic acid and ethylene glycol. In addition to such bifunctional alcohols, polyfunctional alcohols such as, for example, trimethylolethane, trimethylolpropane, pentaerythritol, glycerin, diglycerin, etc. can be used. Further, polyols having an ethylenically unsaturated bond, for example, a polyester diol synthesized using a polycarboxylic acid having an ethylenically unsaturated bond, e.g., maleic acid, itaconic acid or the like as a part of the carboxylic acid component may be used for the preparation of polyurethane resins having an ethylenically unsaturated bond.

The polyol component which can be used favorably in the present invention may include polyether polyols, polycarbonate polyols, acrylic polyols, polyester polyols, etc.

The preparation of the polyurethane resin from the isocyanate component and the polyol component as described above can be performed by a method known per se. For example, a method in which the components are polymerized in a solvent for mixing such as dimethylformamide, methyl ethyl ketone or the like in polymerization tank by heating while mixing and stirring can generally be used, and objective resin can be obtained by controlling the temperature, time, and the like.

Further, in the present invention, it is also possible to prepare polyurethane resins by preparing an isocyanate-terminated prepolymer from the aforementioned isocyanate and polyol components in advance, and then reacting the prepolymer with a chain extender. As the chain extender which can be used here, there can be cited, for example, polyhydric alcohols such as ethylene glycol, 1,4-butylene glycol, 2,3-butylene glycol, hydroquinone diethylol ether, etc.; diamines such as ethylenediamine, propylenediamine, hexamethylenediamine, piperazine, isophoronediamine, cyclohexylmethanediamine, 3,3-dichloro-4-,4'-diaminodiphenylmethane, diphenylmethaneamine, m-phenylenediamine, etc.; modified products of isocyanate such as dimer of tolylene diisocyanate, urea-modified product of isocyanate, urea-modified products of isocyanate, etc.; and the like.

Here, trifunctional or more polyfunctional compounds play a role of a crosslinking agent too.

The polyurethane resin used in the present invention preferably has a weight average molecular weight within the range of generally 300 to 200,000, preferably 1,000 to 150,000, and more preferably 5,000 to 100,000. Hence, upon preparing the polyurethane resin, it is possible to control the molecular weight using, if required, monoalcohols, such as methanol, ethanol, propanol, etc.; monoamines, such as diethylamine, dipropylamine, dibutylamine, etc.; alkanolamines, such as monoethanolamine, diethanolamine, monopropanolamine, dipropanolamine, etc. as a chain terminator.

Further, the aforementioned polyurethane resin may be modified by graft-polymerizing therewith at least one vinyl monomer. As the vinyl monomer to be graft-polymerized, there can be cited, for example, $C_1$-$C_{12}$ alkyl esters of (meth)acrylic acid, such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, etc.; N-$C_1$-$C_6$ alkyl (meth)acrylamide, such as methylol acrylamide, butylol acrylamide, etc.; $C_2$-$C_6$ hydroxyalkyl esters of (meth)acrylate, such as hydroxyethyl (meth)acrylate, hydroxypropyl (meth)acrylate, etc., or caprolactone-modified products thereof (for example, "Praxel FM Series", produced by Daicel Chemical Industry Co., Ltd.); polyalkylene glycol mono(meth)acrylate having a degree of polymerization within the range of 2 to 50, such as triethylene glycol acrylate, diethylene glycol acrylate, poropylene glycol acrylate, hydroxypolyalkylene ether glycol mono(meth)acrylate, etc.; ethylenically unsaturated carboxylic acids, such as acrylic acid, methacrylic acid, maleic acid, itaconic acid, crotonic acid, etc.; oxyalkyl phosphate (meth)acrylate, such as ethylene oxide phosphate (meth)acrylate, propylene oxide phosphate (meth)acrylate, etc.; dicyclopentenyl (meth)acrylate, N-vinylpyrrolidone, acrylonitrile, acrylamide, styrene, vinyltoluene, vinyl acetate, etc. These vinyl monomers may be used singly or two or more of them may be used in combination.

Graft polymerization of these vinyl monomers to the polyurethane resin can be performed by a method known per se, for example, by allowing the polyurethane resin and a monomer to coexist in the presence of a catalyst (azobisisobutyronitrile or the like) and react at a temperature of about 80° C. for about 2 to 3 hours with heating under atmospheric pressure. The graft amount of the vinyl monomer may be varied depending on the kind of the vinyl monomer, characteristics required for the modified polyurethane resin to be obtained and the like but is suitable within the range of generally up to 100% by weight, preferably 70 to 2% by weight, and more preferably 60 to 5% by weight.

As the polyurethane resin particularly preferred for forming the polyurethane resin layer (b) of the present invention, there can be cited, for example, a blend of a crosslinking graft polyurethane resin and an amino resin type crosslinking agent; the crosslinking graft polyurethane resin can be prepared by graft polymerizing a vinyl monomer mixture containing a hydroxyl group-containing vinyl monomer to a polyurethane resin which is prepared using as the polyol component an ethylenically unsaturated bond-containing polyester diol synthesized using a polycarboxylic acid having an ethylenically unsaturated bond as a part of the carboxylic acid component, and containing on average 0.2 to 3, preferably 0.4 to 2.5, and more preferably 0.5 to 2, ethylenically unsaturated bonds in the molecule and having a weight average molecular weight within the range of 300 to 200,000, preferably 1,000 to 150,000, and more preferably 5,000 to 100,000.

The aforementioned hydroxyl group-containing vinyl monomer includes the above-described $C_2$-$C_6$ hydroxyalkyl esters of the aforementioned (meth)acrylic acid or caprolactone-modified products thereof, and polyalkylene glycol mono(meth)acrylates having a degree of polymerization within the range of 2 to 50, etc. They may be present in an amount within the range of generally 90 to 100% by mole, preferably 80 to 20% by mole, and more preferably 70 to 30% by mole, based on total amount of the vinyl monomer mixture.

It is preferred that the vinyl monomer mixture contain the carboxyl group-containing ethylenically unsaturated monomer such as the aforementioned ethylenically unsaturated carboxylic acids in an amount within the range of generally 50 to 5% by mole, preferably 40 to 8% by mole, and more preferably 30 to 10% by mole, based on total amount of the vinyl monomer mixture from a point of view of increasing compatibility with the crosslinking agent to form a uniform clear film and the like.

The remainder of the vinyl monomer mixture may be at least one of the other vinyl monomers referred to hereinabove as the vinyl monomer to be grafted to the polyurethane resin.

It is suitable that these vinyl monomer mixtures be used in an amount within the range of generally no more than 150 parts by weight, preferably 100 to 1 part by weight, and more preferably 70 to 2 parts by weight, per 100 parts by weight of the polyurethane resin to which they are to be grafted.

Grafting reaction of the aforementioned vinyl monomer mixture to the polyurethane resin can be performed according to a graft polymerization method known per se, for example, by subjecting a mixture of the polyurethane resin and a vinyl monomer polymerization reaction in the presence of a usual radical polymerization initiator such as azobisisobutyro-nitrile, benzoyl peroxide, di-tert-butyl peroxide, cumene hydroperoxide, etc., in an inert solvent according to the circumstances.

On the other hand, as the amino resin type crosslinking agent which can be blended with the crosslinking graft polyurethane resin thus prepared, there can be cited, for example, amino resin derivatives obtained by subjecting the amino resin such as melamine resin, benzoguanamine resin, urea resin, etc. to methylolation, methoxylation, butoxylation or the like.

While the compounding amount of the amino resin type crosslinking agents may be varied according to physical properties desired for the polyurethane resin formed, it is convenient that the amino resin type crosslinking agents are used in an amount within the range of usually 5 to 60 parts by weight, preferably 7 to 50 parts by weight, and more preferably 10 to 40 parts by weight.

The polyurethane resin may be blended with additives usually used in the technical field of coating composition, such as a dilution solvent for adjusting its viscosity (for example, dimethylformamide, methyl ethyl ketone, tetrahydrofuran, methylene chloride, alcohols, etc.), leveling agents (for example, dimethylpolysiloxane, fluorine-containing oligomers, acrylic oligomers, etc.), thixotropic agent (for example, polycarboxylic acid having a high degree of polymerization and salts thereof, particulate silicon dioxide, particulate calcium carbonate, particulate organic bentonite, etc.), and the like. If required, the polyurethane resin may contain catalysts for curing, colorants (dyes, general pigments, pearl pigments, metallic flakes, etc.), ultraviolet light absorbents, antioxidants, etc.

Further, in order to increase adhesion between adjacent layers, and improve mechanical properties and chemical resistance, the polyurethane resin may be blended with no more than 200 parts by weight, preferably no more than 150 parts by weight, and more preferably no more than 100 parts by weight, per 100 parts by weight of the polyurethane resin, of one or more other resins having compatibility therewith, for example, phenol resins, furan resins, urea resins, melamine resins, guanamine resins, polyester type resins, epoxy resins, silicon resins, polyamide type resins, polyvinyl chloride type resins, polyvinylidene chloride type resins, vinyl acetate type resins, polyvinyl alcohols, polyvinyl acetals, alkyd resins, styrene type resins, AS resins, ABS resins, AXS resins, (meth)acrylic resins, EVA resins, polyamide resins, cellulose derivatives, petroleum resins, etc.

The polyurethane type resins thus far described can be applied to one surface of the aforementioned polyvinyl chloride type resin film (a) to form a polyurethane type resin film layer (b).

As the method for applying the polyurethane type resin on the polyvinyl chloride type resin film (a), there can be cited, for example, a method in which a solution of the aforementioned polyurethane type resin having a suitable viscosity is prepared, and the solution is coated by usually used coating method such as spray coating, curtain flow coating, roll coater coating, doctor knife coating, dip coating flow coating, brush coating or the like.

While the thickness of the polyurethane type resin layer is not limited strictly, too small a thickness results in insufficient protection of a metal layer to be coated thereon, bonding, weatherability, etc. or on the contrary too large a thickness is not only uneconomical but also decreases the flexibility of the laminated resin film obtained. Accordingly, it is suitable that the thickness of the polyurethane type resin layer (b) be within the range of generally 0.5 to 50 microns, preferably 1 to 30 microns, and more preferably 2 to 20 microns.

In the case where the aforementioned crosslinking grafted urethane resin blended with an amino resin type crosslinking agent is used as the polyurethane type resin, crosslinking can be performed by heating the polyurethane type resin after being applied to the polyvinyl chloride type resin film (a). This heat crosslinking may be carried out upon bonding of the metal layer or in advance. On this occasion, the heat crosslinking may be performed by heating generally at about 100 to about 200° C. for about 0.5 to about 30 hours.

The polyurethane type resin layer (b) formed as described above is selected so as to have a total visible light transmission of at least 30%, preferably not lower than 40%, and more preferably not lower than 40%, and most preferably not lower than 50%, and a tensile strength at 100% elongation within the range of 50 to 550 kg/cm$^2$, preferably 60 to 450 kg/cm$^2$, and more preferably 70 to 350 kg./cm$^2$.

Further, it is desirable that the polyurethane type resin layer (b) have a glass transition temperature (Tg) within the range of generally not lower than −60° C. preferably not lower than −50° C., and more preferably not lower than −40° C., and a surface tension of not smaller than 30 dyne/cm, preferably not smaller than 33 dyne/cm, and more preferably not smaller than 35 dyne/cm in order to increase bonding between adjacent layers. It is also preferred that the resin layer (b) have a molecular structure crosslinked three-dimensionally while maintaining its flexibility so as to have thermal resistance and solvent resistance.

Metal Layer (c)

On the surface of the aforementioned polyurethane type resin layer is bonded the metal layer (c) in order to impact the laminated resin film of the present invention with a metallic tone appearance. The thickness of the metal layer (c) may be within the range of 50 to 2,000 Å, preferably 100 to 1,000 Å and more preferably 300 to 600 Å.

As the method for bonding the metal layer of such a thickness on the polyurethane type resin layer (b), there can be used a transfer method in which the polyurethane type resin is coated on the polyvinyl chloride type resin film, and before drying a deposited film composed of a polyester film on which a metal is deposited (the deposited layer peels off from the polyester film with ease) is laminated on the polyurethane type resin layer in such a manner that the metal-deposited surface contacts the polyurethane type resin, followed by peeling off only the polyester film, or alternatively, a polyurethane type resin solution is coated on the metal-deposited surface of a deposited film composed of a polyester film having deposited thereon a metal deposited film, dried, and a polyvinyl chloride type resin solution is coated thereon and dried, followed by peeling off the polyester film; or a plasma method in which raw material gas is converted into a plasma state to produce excited molecules, atoms, ions, radicals which are chemically very active to promote chemical reaction to prepare a thin film on a substrate. Generally, metal deposition method and sputtering method are suitable.

Bonding of the metal layer onto the polyurethane type resin layer (b) by metal deposition or sputtering can be carried out by a method know per se, for example, by methods as described in Vacuum Deposition (authored by Siegfried-Schiller, Ulrich, and Heisich, translated by Japan Vacuum Technology Co., Ltd., and other literatures.

No particular limitation is posed on the kind of the metal used for forming the metal layer (c) and can be selected from a wide range depending on the utility of the laminated resin film. There can be cited, for example, aluminum, gold, silver, copper, nickel, chromium, magnesium, zinc, etc., or alloys composed of two or more of them. Among them, aluminum, chromium, nickel, etc. are preferred from a point of view of workability, ease of formation, durability and the like while chromium is particularly preferred in view of corrosion resistance.

Acrylic Type Resin Layer (d)

While the laminated resin film of the present invention may comprise the aforementioned polyvinyl chloride type resin film (a), polyurethane type resin layer (b), metal layer (c), an acrylic type resin layer (d) may also be provided as an additional layer on the metal layer (c). This prevents corrosion of the metal layer due to penetration of moisture from the back surface (the surface other than the side of the polyvinyl chloride type resin film (a) and the polyurethane type resin (b), and also prevents transfer deterioration of the metal layer toward the polyurethane type resin by bonding and fixing the acrylic type resin layer (d) to the metal layer, thus making it possible to improve various physical properties such as weatherability, etc.

The acrylic type resin which can be used for this purpose includes polymers at least 50% by weight, preferably 55 to 98% by weight, and more preferably 60 to 95% by weight, based on total polymer, of (meth)acrylic type monomer units.

As the (meth)acrylic type monomer used in the preparation of such acrylic type resins, there can be cited, for example, (meth)acrylic type monomers, such as methyl (meth)acrylate, ethyl (meth)acrylate, butyl (meth)acrylate, pentyl (meth)acrylate, hexyl (meth)acrylate, heptyl (meth)acrylate, octyl (meth)acrylate, propyl (meth)acrylate, 2-hydroxyethyl (meth)acrylate, 2-ethylhexyl (meth)acrylate, 2-hydroxypropyl (meth)acrylate, dimethylaminoethyl (meth)acrylate, glycidyl (meth)acrylate, and ethylene glycol dimethacrylate, etc., vinyl ester monomers such as vinyl acetate, and vinyl propionate, etc. These may be used singly or two or more of them may be used in combination.

The acrylic type monomers may be copolymerized with at least one other copolymerizable vinyl monomer. As for the vinyl monomer, there can be cited, for example, carboxyl group-containing vinyl monomers such as acrylic acid, methacrylic acid, itaconic acid, etc., and hydroxyl group-containing vinyl monomers such as hydroxymethyl ester, hydroxyethyl ester, hydroxypropyl ester, hydroxybutyl ester, hydroxypentyl ester, hydroxyhexyl ester, etc. of (meth)acrylic acid, and further epoxy group- and amino group-containing vinyl monomers.

As the components other than described above, there can be utilized polyvinyl chloride, vinyl chloride-vinyl acetate copolymers, urethane resins, epoxy resins, vinyl chloride-ethylene copolymers, etc.

The acrylic type resin applied onto the metal (c) generally must have a moderate flexibility and strength, and desirably have a weight average molecular weight of 10,000 to 1,000,000, and preferably 50,000 to 500,000. For the same reason, it is desirable that its Tg be $-50°$ C. to 70° C., preferably $-30°$ C. to 50° C., and more preferably $-10°$ C. to 30° C.

Application of such an acrylic type resin onto the metal layer (c) can be carried out, for example, by preparing a solution or dispersion of the acrylic type resin having a suitable viscosity, and applying the solution or dispersion by spray coating, curtain flow coating, roll coater coating, doctor knife coating, dip coating, flow coating, brush coating, or the like.

In this case, the acrylic type resin may be crosslinked utilizing functional groups such as hydroxyl groups which exist therein, or may be blended with colorants (dyes, general pigments, pearl pigments, metal flakes, etc.), ultraviolet light absorbent, stabilizers, resins for modification according to the circumstances.

The thickness of the acrylic type resin layer (d) is not limited strictly but is suitably within the range of generally 0.5 to 100 microns, preferably 0.7 to 30 microns, and more preferably 1 to 15 microns.

In the present invention, a layer composed of a resin such as the aforementioned polyurethane type resin or the like, instead of the acrylic type resin layer (d), may be provided on the metal layer (c).

Utility

The laminated resin film provided by the present invention can be used as a marking film, as described above, by being affixed onto a suitable substrate for imparting it with a beautiful, metallic tone ornament.

For the purpose, a layer of an adhesive or pressure-sensitive adhesive may be applied on the surface of the metal layer (c) or acrylic type resin layer (d) of the laminated resin film of the present invention, and further, a release paper may be affixed onto the layer so that the layer can be protected from contamination or the like until time of use.

The adhesive or pressure-sensitive adhesive which can be applied is not limited particularly and may be selected suitably depending on the kind of substrate onto which it is to be affixed. Generally, those excellent in water resistance are preferred. There can be cited, for example, rubber type adhesives, acrylic adhesives, vinyl acetate type adhesives, urethane type adhesives, silicone type adhesives, and other types of adhesives as well as suitable mixed type adhesives thereof.

As the aforementioned rubber type adhesive, there can be cited, for example, natural rubbers, isoprene rubbers, styrene-butadiene rubbers, styrene-butadiene blocked copolymers, styrene-isoprene blocked copolymers, butyl rubbers, polyisobutylenes, silicone rubbers, polyvinyl isobutyl ethers, chloroprene rubbers, nitrile rubbers, etc., and mixtures thereof or those containing at least one of them as the major component. Those having some crosslinked structures between the molecules may be used preferably.

The acrylic type adhesive and vinyl acetate type adhesive may be, for example, an adhesive layer formed of a solvent type adhesive composed mainly of an unsaturated carboxylic acid ester type copolymer, and particularly preferred is an adhesive layer formed of 100 parts by weight of a solvent type adhesive derived from 99.9 to 85 parts by weight of an unsaturated carboxylic ester monomer and 0.1 to 15 parts by weight of a vinyl monomer having a crosslinking functional group and having a glass transition temperature (Tg) of no higher than $-20°$ C.; 70 to 400 parts by weight of a detergent; and 0.01 to 20 parts by weight of a crosslinking agent which can crosslink with the aforementioned crosslinking functional group.

As the unsaturated carboxylic acid ester monomer for preparing the copolymer constituting the aforementioned adhesive, there can be cited, for example, (meth)acrylic acid ester monomers such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, etc., and vinyl ester monomers such as vinyl acetate, vinyl propionate, etc.

As the vinyl monomer having a crosslinking functional group for obtaining the aforementioned polymers, there can be cited, for example, carboxyl group-containing vinyl monomers such as acrylic acid, methacrylic acid, itaconic acid, etc., and hydroxyl group-containing vinyl monomers such as hydroxymethyl ester, hydroxyethyl ester, hydroxypropyl ester, hydroxybutyl ester, hydroxypentyl ester, hydroxyhexyl ester, etc. of acrylic acid, hydroxymethyl ester, hydroxyethyl ester, hydroxypropyl ester, hydroxybutyl ester, hydroxypentyl ester, hydroxyhexyl ester, etc. of methacrylic acid, and further epoxy group and amino group-containing vinyl monomers.

As the solvent, ethyl acetate, toluene, acetone, isopropyl alcohol, etc. are preferred.

As the crosslinking agent, there can be cited organic multifunctional isocyanate compounds. Specific examples thereof include so-called aromatic multifunctional isocyanates such as p-phenylene diisocyanate, 4,4'-diphenylmethane diisocyanate, 2,4-toluylene diisocyanate, 2,6-toluylene diisocyanate, xylylene diisocyanate, triisocyanate, naphthalene 1,5-diisocyanate, etc., pentamethylene diisocyanate, hexamethylene diisocyanate, cyanate, heptamethylene diisocyanate, 4,4'-dicyclohexylbutane diisocyanate, etc.

The glass transition temperatures, Tg, of the aforementioned copolymers were measured by the following measurement method.

About 10 mg of a resin solution sample is weighted in a cell and dried at 100° C. for 2 hours, which is used as a sample for measurement. Using Differential Scanning Calorimeter Model DT-30, produced by Shimazu Seisakusho, measurement and determination are made at a temperature elevation rate of 20° C./min starting from −80° C. The measurement is carried out using nitrogen gas as a carrier gas at a flow rate of 20 cc/min.

Examples of the aforementioned urethane type adhesive include those composed of high molecular weight compounds produced by the reaction of an isocyanate, such as triphenylmethane-p,p',p''-triisocyanate, hexamethylene diisocyanate, diphenylmethane-4,4'-diisocyanate, toluene diisocyanate, or the like, with a compound having an activated hydrogen atom, for example, polyester, polyether glycol, polyacrylate, or polyamide having an activated hydrogen atom, their mixtures or those containing at least one of them as a major component.

As the silicone type adhesive, there can be cited linear or grafted compounds containing as a major component dimethylpolysiloxane, diphenylpolysiloxane, or organopolysiloxane.

These may be applied onto the laminated resin film, for example, by forming a layer of the aforementioned adhesive on a release paper obtained by treating with silicone a polyethylene layer of a high quality paper laminated on the surfaces thereof with a polyethylene, polypropylene film treated with silicone, polyethylene film treated with silicone, or the like, and laminating thereon the laminated resin film.

The laminated resin film of the present invention can be affixed onto a surface of a substrate by a hot lamination method. For example, i) In the Case Where There is the Acrylic Resin Layer (d)

At a softening temperature of the acrylic resin layer (d), the laminated resin film is pressed onto the adherend at a pressure of 1 to 50 kg/cm² using a rubber roll or the like. In a particular case where the adherend is aluminum, it is preferable that the surface thereof is subjected to formation treatment in advance to form an oxide film because this increases the degree of adhesion;

ii) In the Case Where the Acrylic Resin Layer (d) is Absent

A resin substrate which gets softened with heating is used as an adherend, and a metal substrate coated on its surface with such a resin is also used. The laminated film is pressed onto the substrate at the softening temperature of the resin at a pressure of 1 t 50 kg/cm² using a rubber roll or the like.

The laminated resin film of the present invention allows printing on its surface layer (polyvinyl chloride layer) freely as desired, and can provide various designs. Further, the use of inks having excellent weatherabilities (for example, Haiesu SP Ink, Haiesu FP Ink, etc. produced by Nippon Carbide Industry) enables their use in the open air and can provide a film having a flexibility and having a metallic appearance which has never been obtained conventionally.

BEST MODE FOR CARRYING OUT THE INVENTION EXAMPLE

Figure 1:
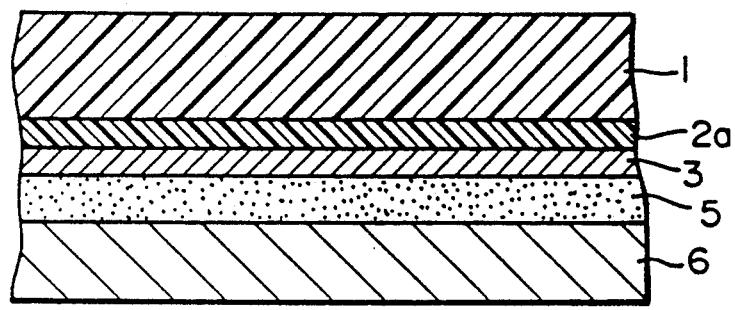
FIG. 1 is a schematic, fragmental cross-sectional view showing a laminated resin film having a metallic appearance according to Examples 1 to 5.

Next, the present invention will be explained more concretely by way of examples.

The physical and chemical properties described in the description including examples and in claims have been measured by the methods described below.

(1) Tensile Testing (Measurement of Tensile Strength at 5% Elongation)

Samples for tensile testing were prepared by cutting sample films to predetermined shape according to JIS-K-6734, and the samples were subjected to tensile testing using a tensile tester (produced by Toyo Seiki Seiksakusho Co., Ltd.) under the conditions of a temperature of 23°±2° C., in an atmosphere of a relative humidity of 50±5%, an elongation rate of 200 mm/min., an elongation distance of 100 mm, and a chart speed o 500 mm/min. From the chart obtained then strengths at 5% elongation were read, and the values were defined as tensile strengths at 5% elongation.

(2) Tensile Testing (Measurement of Tensile Strength at 100% Elongation)

According to JIS-K-6734 in which it is prescribed that a film of the resin for the polyurethane layer is formed on a glass plate and dried in a drier at 120° C. ×1 Hr and films having a thickness of 10μ are sued as samples, sample films were cut to a determined shape to prepare samples for tensile testing. The samples were subjected to tensile using a tensile tester (produced by Toyo Seiki Seisakusho Co., Ltd.) under the conditions of a temperature of 23°±2° C., in an atmosphere of a relative humidity of 50±5%, an elongation rate of 200 mm/min., an elongation distance of 100 mm, and a chart speed o 100 mm/min. From the chart obtained then strengths at 100% elongation were read.

(3) Total Light Transmission

Total light transmission was measured using a direct reading Haze Meter (produced by Toyo Seiki Seisakusho Co., Ltd.) according to the measurement of light transmission prescribed in JIS-K-6714.

(4) Heat Resistance of Polyurethane Resin Layer

The same samples as in Tensile Testing (2) above were prepared and the samples were mounted on an alkyd melamine coated white panel (produced by Nippon Test Panel Co., Ltd.; hereafter, simply referred to as white panel) and measured as follows.

That is, using Macbeth Spectrometer Color-Eye MS-2020 (produced by Kollomorgen Corporation) as a tester measurement was performed and dE values according to CIE 1976 (L*a*b*) under standard light source C were obtained for standard samples and heat-treated samples (treated at 150° C. for 20 minutes), and the numerical values obtained were evaluated by the following five ratings:
5: Below 3
4: 3 or more and below 5
3: 5 or more and below 7
2: 7 or more and below 9
1: 9 or more

(5) Heat Resistance

A metallic tone film was cut to 50 mm×50 mm, and the peel paper was peeled off. Thereafter, this was affixed onto an alkyd melamine coated panel (produced by Nippon Test Panel Industry Co., Ltd.) using a squeegee. Then, this was left to stand in an oven with internal air circulation set at 80° C.±2° C. for 168 hours without movement to carry out heat treatment. After completion of the heat treatment, the panel was taken out and the state of the film crack was observed and rated in the following five ratings:

5: Film surface has no crack and has a mirror surface property.
4: Film surface has cracks partly but retains a mirror surface property.
3: Film surface has cracks partly and has lost a mirror surface property partly.
2: Film surface has cracks over its entirety and has lost a mirror surface property partly.
1: Film surface has cracks over its entirety and has lost a mirror surface.

(6) Curved Surface Affixing Suitability

Metallic tone films were affixed onto a curved surface on the bottom of a stainless steel bowl of 180 mm in diameter and evaluation was made by determining the diameter of the circular metallic tone film for exterior use which was able to be affixed without causing wrinkles. Evaluation method was to find out maximum diameter value, which was defined as curved surface affixing suitability value, and evaluated by the following five ratings:
5: 40 mm or larger
4: 30 mm of larger and smaller than 40 mm
3: 20 mm or larger and smaller than 30 mm
2: 10 mm or larger and smaller than 20 mm
1: Smaller than 10 mm

(7) Degree of Adhesion of Polyurethane Type Resin Layer onto Polyvinyl Chloride Resin Film A film prior to the stage of metal deposition was formed with a pressure-sensitive adhesive layer, and the film was affixed onto an aluminum plate. The plate was immersed in hot water at 80° C. for 4 hours and then taken out from the hot water, left to stand for 24 hours. Thereafter, the degree of adhesion between the surface resin layer and the (first) intermediate layer was checked by trying to separate the layers with a single blade razor.

Evaluation was made by the following five ratings:
5 Surface resin layer and (first) intermediate layer are bonded completely.
4: Surface resin layer and (first) intermediate layer are separated by 20% or less.
3: Surface resin layer and (first) intermediate layer are separated by above 20% and 50% or less.
2: Surface resin layer and (first) intermediate layer are separated by above 50% and 80% or less.
1: Surface resin layer and (first) intermediate layer are separated by above 80%.

(8) Degree of Adhesion of Metal Layer

A cellophane tape was pressed onto the metal layer side of samples prior to the sage of forming a pressure-sensitive adhesive layer (or adhesive layer) or second intermediate layer, and the state of peeling of the metal layer when the cellophane tape was peeled off quickly was observed and evaluated by the following five ratings:
5: Metal layer does not peel off.
4: Metal layer peels off in dots.
3: Metal layer peels off by 20% or less.
2: Metal layer peels off by above 20% and 80% or less
1: Metal layer peels off by above 80%.

(9) Hot Water Resistance (1)

Films prior to metal deposition were immersed in hot water at 40° C. for 168 hours, and their degree of whitening was evaluated by the following five ratings:
5 No abnormality.
4: Very slight whitening occurs in a part of the film.
3: Very slight whitening occurs over the entire film.
2: Whitening occurs in a part of the film.
1: Whitening occurs over the entire film.

(10) Hot Water Resistance (2)

A metallic tone film was cut to 50 mm×50 mm, and the peel paper was peeled off. Thereafter, this was affixed onto an alkyd melamine coated panel (produced by Nippon Test Panel Industry Co., Ltd.) using a squeegee. After being left to stand at room temperature for 72 hours, the panel was immersed in hot water at 80° C. for 4 hours, and evaluation was made by the same criteria as above.

(11) Solvent Resistance (1) Against gasoline: A metallic tone film was cut to 50 mm×50 mm, and the peel paper was peeled off. Thereafter, this was affixed onto an alkyd melamine coated panel (produced b Nippon Test Panel Industry Co., Ltd.) using a squeegee. After being left to stand at room temperature for 72 hours, the panel was immersed in gasoline at 20° C. for 30 minutes, and the appearance of the film at that time was evaluated by the following five ratings:
5: No abnormality.
4: Cracks occur in 20% or less of the entire film surface
3: Cracks occur in 50% or less of the entire film surface
2: Cracks occur in 80% or less of the entire film surface
1: Cracks occur over the entire film surface.

(2) Against Methanol: A metallic tone film was cut to 50 mm×50 mm, and the peel paper was peeled off. Thereafter, this was affixed onto an alkyd melamine coated panel (produced by Nippon Test Panel Industry Co., Ltd.) using a squeegee. After being left to stand at room temperature for 72 hours, the panel was immersed in methanol at 20° C. for 10 minutes, and the appearance of the film at that time was evaluated by the following five ratings:
5: No abnormality.

4: Surface mirror property is lost from place to place in the edge portion of the film. is lost only in the
3: Surface mirror property edge portion of the film.
2: Surface mirror property is lost partly including the edge portion of the film.
1: Surface mirror property is lost over the entire film surface.

(12) Chemical Resistance (1) Against Acid: A metallic tone film was cut to 50 mm×50 mm, and the peel paper was peeled off. Thereafter, this was affixed onto an alkyd melamine coated panel (produced by Nippon Test Panel Industry Co., Ltd.) using a squeegee. After being left to stand at room temperature for 72 hours, the panel was immersed in an aqueous solution of 200 ppm $H_2SO_3$ at room temperature for 14 days, and the appearance of the film at that time was evaluated by the following five ratings:
5: No abnormality.
4: Corrosion of metal occurs from place to place in the edge portion of the film.
3: Corrosion of metal occurs only in the edge portion of the film.
2: Corrosion of metal occurs partly including the edge portion of the film.
1: Corrosion of metal occurs over the entire film surface.

(2) Against Brine: A metallic tone film was cut to 50 mm×50 mm, and the peel paper was peeled off. Thereafter, this was affixed onto an alkyd melamine coated panel (produced by Nippon Test Panel Industry Co., Ltd.) using a squeegee. After being left to stand at room temperature for 72 hours, the panel was immersed in an aqueous solution of 3% NaCl at room temperature for 1 month, and the appearance of the film at that time was evaluated by the same five ratings as in the acid resistance evaluation (1) above.

(13) Weatherability

Weatherability (1): A metallic tone film was cut to 35 mm×60 mm, and the peel paper was peeled off. Thereafter, this was affixed onto an alkyd melamine coated panel (produced by Nippon Test Panel Industry Co., Ltd.) using a squeegee. The panel was set at an angle of 5° facing the south in Florida, U.S.A. After being exposed in the open air for 6 months or 12 months the appearance of the film was visually evaluated by the following five ratings:
5: No abnormality.
4: Surface mirror property is lost from place to place in the edge portion of the film.
3: Surface mirror property is lost only in the edge portion of the film.
2: Surface mirror property is lost partly including the edge portion of the film.
1: Surface mirror property is lost over the entire film surface.

Weatherability (2): A metallic tone film for exterior use was affixed onto an aluminum panel (17×35 mm), and left to stand at room temperature sufficiently. Thereafter, the plate was subjected to accelerated exposure test using Q.U.V. (The Q-Panel Company).

The exposure conditions at that time were UV light irradiation at a black panel temperature 60° C. for 8 hours, and moisture condensation at a black panel temperature of 60° C., which formed one cycle.

Evaluations were made by comparing the samples with standard samples (surface resin layer) after 100 hours, 300 hours, and 7 hours, respectively, by the same evaluation criteria as in the above weatherability (1).

Weatherability (3): Almost the same as the above weatherability (2) except that the exposure conditions were changed to black panel temperature of 70° C.

EXAMPLE 1

First, a film of 40μ in thickness was prepared by a casting method using a resin composition composed of the following basic formulation, and this was used as a polyvinyl chloride type resin film in a laminated resin film having a metallic tone appearance.

The film had a tensile strength at 5% elongation of 1.5 kg/cm and a total light transmission of 89%. As indicated later on, the film was subjected to the subsequent steps in a state of being bonded onto a support film.

| Base Formulation | |
|---|---|
| Vinyl chloride resin | 100 |
| Ethylene/vinyl ester type resin | 25 |
| Polyester plasticizer | 10 |

Nikavinyl SG-1100N (produced by Nippon Carbide Industry Co., Ltd.) and Elvalloy were used as the vinyl chloride resin and the ethylene/vinyl ester type resin, respectively. As the polyester plasticizer, there was used one synthesized from a mixed dihydric alcohol composed of propylene glycol, butanediol and hexanediol, and adipic acid and having a number average molecular weight (Mn) of about 3,000. Specifically, the preparation of the film by the casting method was performed as follows.

That is, Tetrahydrofuran was added to mixed resin components so that the concentration of the resin was 20% by weight, and mixture was stirred for dissolution at 100° C. for 2 hours in a sealed vessel to obtain a resin solution composition.

Then, after being cooled and defoamed, the aforementioned resin solution composition was cast on a polyester film (support film) using a caster, dried with hot air at 140° C. for 15 minutes to prepare a polyvinyl chloride type resin film in a state of being bonded onto the support film.

Next, the polyurethane (urethane resin) solution described below was coated on one surface of the aforementioned polyvinyl chloride type resin film using a screen printer (trade name: Minomat 600L, produced by Mino Group) and a 180 mesh monotetrone screen, and dried in an oven controlled at 120° C.±3° C. for 60 minutes to form a 10μ thick intermediate layer. The intermediate layer had a total light transmission of 88%. As the polyurethane solution, there was used trade name: Barnok L7-920 (produced by Dainippon Ink and Chemical Industry Co., Ltd., 25±1% nonvolatile content, solvent toluene, secondary-butanol, viscosity $Z_1$-$Z_4$).

After a metal layer having a thickness of about 500Å was formed by aluminum deposition on a surface of the aforementioned polyurethane resin layer, a mixed solution composed of 100 parts by weight of an acrylic type pressure-sensitive adhesive (trade name: PE-121, produced by Nippon Carbide Industry Co., Ltd.)) and 1 part by weight of a crosslinking agent (trade name: Coronate L, produced by Nippon Polyurethane Industry Co., Ltd.) was coated on the surface of the metal, and dried to form a pressure-sensitive adhesive layer of about 35μ thick. Further, after a silicone-coated release paper was affixed onto the coated surface of the pressure-sensitive adhesive layer, the support film composed of a polyester was peeled off to prepare a laminated resin film having a metallic appearance.

The film thus prepared, as schematically shown in fragmental cross-section in FIG. 1, has a structure composed of a polyvinyl chloride type resin film 1 having thereon a coating of a polyurethane type resin layer 2a having laminated thereon a metal layer (d), (a metal layer 3) a pressure-sensitive adhesive layer 5, and a release paper 6 in this order.

Results of evaluations of the aforementioned test items on the laminated resin film having a metallic appearance according to Example 1 together with the results in Examples 2 to 7 are shown in Table 1 below.

For comparison, results in the case of the surface resin layer alone (Comparative Example 1 explained below) are also shown.

EXAMPLE 2

The laminated resin film having a metallic appearance according to Example 2 had substantially the same structure and size as that in Example 1 and prepared by substantially the same method as Example 1 above except that the polyurethane type resin layer was made of the urethane type resin described below.

The polyurethane resin in Example 2 is a graft polymer obtained by grafting the polyurethane resin below with an acrylic monomer, that is, a non-discoloring acryl grafted urethane lacquer, trade name: Barnok L8-921 (produced by Dainippon Ink and Chemicals Industry Co., Ltd., nonvolatile content: 25±1%, solvent toluene, DMF) obtained by grafting a mixed monomer containing at least a hydroxyl group-containing α-β ethylene type monomer and a carboxyl group-containing α-β ethylene type monomer to a base urethane, trade name: Barnok L7-920 used in Reference Example 1. The layer made of the aforementioned urethane type resin had a total light transmission of 88%.

EXAMPLE 3

The laminated resin film having a metallic appearance according to Example 3 had substantially the same structure and size as that in Example 1 and prepared by substantially the same method as Example 1 above except that the polyurethane type resin layer was made of the urethane type resin described below.

The urethane type resin in Example 3 has a basic formulation composed of 100 parts by weight of a urethane resin and 25 parts by weight a crosslinking agent. As the aforementioned urethane resin, there was used trade name: Barnok K7-920, and as the crosslinking agent was used butylated melamine resin, trade name: Super Backamine J-820-60 (produced by Dainippon Ink and Chemicals Industry Co., Ltd., nonvolatile content 60%, solvent xylene, n-butanol, viscosity Q-T). The layer made of the aforementioned urethane type resin had a total light transmission of 88%.

EXAMPLE 4

The laminated resin film having a metallic appearance according to Example 4 had substantially the same structure and size as that in Example 1 and prepared by substantially the same method as Example 1 above except that the polyurethane type resin layer was made of the urethane type resin described below.

The urethane type resin in Example 4 has a basic formulation composed of 100 parts by weight of a grafted polyurethane resin and 25 parts by weight a crosslinking agent. As the aforementioned grafted polyurethane resin, there was used trade name: Barnok L8-971 used in Reference Example 2 above, and as the crosslinking agent was used the butylated melamine resin, trade name: Super Beckamine J-820-60 used in Reference Example 3 above. The layer made of the aforementioned urethane type resin had a total light transmission of 88%.

EXAMPLE 5

The laminated resin film having a metallic appearance according to Example 5 had substantially the same structure and size as that in Example 4 and prepared by substantially the same method as Example 4 above except that the polyurethane type resin layer was made of the urethane type resin described below.

The urethane type resin in Example 5 was prepared by first mixing a polyester diol (prepared by mixing in total 100 parts by weight of adipic acid:maleic anhydride:propylene glycol:ethylene glycol=100:1:50:55) with 250 parts by weight of a mixed solvent composed of dimethylformamide:methyl ethyl ketone:=3:1 and stirring the mixture in a polymerization apparatus at 80° C. for 4 hours for polymerization) with hexamethylene diisocyanate in a ratio of 5:2, and stirring the mixture in a polymerization apparatus at 80° C. for 6 hours. Further, 100 parts by weight of the aforementioned polyurethane resin was mixed with 10 parts by weight of hydroxypropyl methacrylate, 5 parts by weight of acrylic acid, 2 parts by weight of methyl acrylate, and 30 parts by weight of azobisisobutyronitrile, and stirred in a polymerization apparatus at 80° C. for 3 hours. The layer made of the aforementioned urethane type resin had a total light transmission of 88%.

EXAMPLE 6

Figure 2:
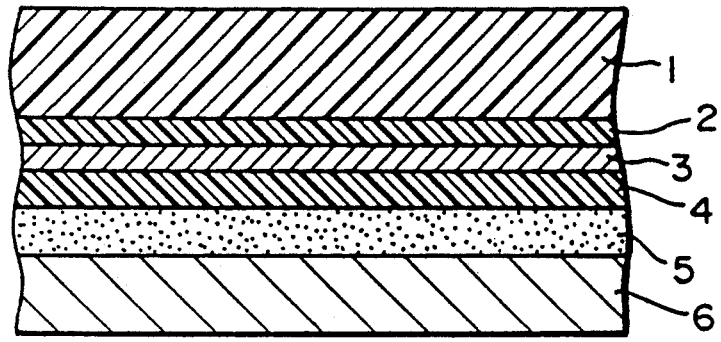
FIG. 2 is a schematic, fragmental cross-sectional view showing a laminated resin film having a metallic appearance according to Examples 6 and 7.

The laminated resin film having a metallic appearance according to Example 6 is composed of the metallic tone film of Example 4 above in which an acrylic type resin layer (d) is formed by bonding onto the opposite surface of the metal layer (c) for backing it. The film thus prepared, as schematically shown in fragmental cross-section in FIG. 2, has the common structure as the metallic tone film for exterior use as shown in FIG. 1 except that the aforementioned acrylic type resin layer (d) 4 is formed by bonding onto the opposite surface of the metal layer (c) (metal layer 3). The polyurethane resin layer 2a in FIG. 1 corresponds to the polyurethane type resin layer 2 in FIG. 2.

After the acrylic type resin layer 4 was formed with the metal layer 3 in the same manner as in Example 4 above, the polymer solution containing an acrylic type resin described below was coated on the opposite surface of the aforementioned metal layer using a screen printer (trade name: Minomat 600 L, produced by Mino Group) and a 180 mesh monotetrone screen in the same manner as the layer in Example 1 above. Then it was dried in an oven controlled at 120° C.±3° C. for 60 minutes to form a 10μ thick intermediate layer. The aforementioned acrylic type resin layer had a total light transmission of 88%.

The polymer solution for forming the aforementioned acrylic type resin layer 4 was prepared by adding 14 parts by weight of Coronate EH (produced by Nippon Polyurethane Industry Co., Ltd.) to 100 parts by weight of a xylene solution composed of 58% by weight of methyl methacrylate, 30% by weight of butyl acrylate and 12% by weight of 2-hydroxyethyl methacrylate and having a resin content of 48%, stirring sufficiently for mixing.

Degree of adhesion between the metal layer 3 and the acrylic type resin layer 4 was evaluated by the same method described in the column of "Degree of Adhesion of Polyurethane Type Resin Layer to Surface Resin Layer" to reveal that degree of adhesion was very good.

EXAMPLE 7

The laminated resin film having a metallic appearance according to Example 7 had substantially the same structure and size as that in Example 6 and prepared by substantially the same method as Example 6 above except that the polyurethane type resin layer was made of the urethane type resin used in Example 5 above.

COMPARATIVE EXAMPLE 1

The laminated resin film having a metallic appearance according to Comparative Example 1 was prepared in the same manner as in Example 1 above except that the metal layer (d) (metal layer 3) was formed by bonding to the polyvinyl chloride type resin film 1 directly without forming the polyurethane type resin layer 2a.

TABLE 1

| Item of Testing | Example 1 | Example 2 | Example 3 | Example 4 | Example 5 | Example 6 | Example 7 | Comparative Example 1 |
| --- | --- | --- | --- | --- | --- | --- | --- | --- |
| Tensile strength at 5% elongation (kg/cm) | 1.5 | 1.5 | 1.5 | 1.5 | 1.5 | 1.8 | 1.8 | 1.5 |
| Tensile strength at 100% elongation of polyurethane type resin layer (kg/cm) | 100 | 170 | 140 | 200 | 200 | 200 | 200 | — |
| Total light transmission of polyurethane type resin layer (%) | 88 | 88 | 88 | 88 | 88 | 88 | 88 | — |
| Hot water resistance (1) | 3 | 3 | 4 | 5 | 5 | 5 | 5 | 1 |
| Hot water resistance (2) | 3 | 2 | 4 | 5 | 5 | 5 | 5 | 1 |
| Degree of adhesion of polyurethane type resin layer to polyvinyl chloride type resin film | 5 | 5 | 5 | 5 | 5 | 5 | 5 | — |
| Degree of adhesion of metal layer | 3 | 5 | 3 | 5 | 5 | 5 | 5 | 1 |
| Curved surface affixing suitability (mm) | 5 | 5 | 5 | 5 | 5 | 5 | 5 | 5 |
| Heat resistance (80° C. × 168 hr) | 5 | 3 | 4 | 4 | 5 | 5 | 5 | 1 |
| Gasoline Resistance (30 minutes) | 4 | 4 | 5 | 5 | 5 | 5 | 5 | — |
| Methanol Resistance (10 minutes) | 4 | 5 | 5 | 5 | 5 | 5 | 5 | 1 |
| Acid resistance (H2SO3 solution) | 3 | 5 | 5 | 5 | 5 | 5 | 5 | 1 |
| Brine resistance (NaCl solution) | 5 | 5 | 5 | 5 | 5 | 5 | 5 | 1 |
| Weatherability (1) | | | | | | | | |
| Florida actual 6 months | 3 | 3 | 4 | 5 | 5 | 5 | 5 | 1 |
| exposure test 12 months | 3 | 3 | 3 | 4 | 4 | 5 | 5 | 1 |
| Weatherability (2) | | | | | | | | |
| QUV 100 hr | 4 | 4 | 5 | 5 | 5 | 5 | 5 | 1 |
| 300 hr | 3 | 3 | 4 | 5 | 5 | 5 | 5 | 1 |
| 700 hr | 3 | 3 | 3 | 4 | 4 | 5 | 5 | 1 |
| Weatherability (3) | | | | | | | | |
| QUV 100 hr | 2 | 2 | 2 | 5 | 5 | 5 | 5 | 1 |
| 300 hr | 2 | 2 | 2 | 3 | 3 | 5 | 5 | 1 |
| 700 hr | 2 | 2 | 2 | 3 | 3 | 5 | 5 | 1 |

From Table 1 above, it can be understood that the laminated resin films having a metallic appearance according to Examples 1 to 5 are superior over the laminated resin film having a metallic appearance according to Comparative Example 1 in various properties, and the laminated resin films having a metallic appearance according to Examples 6 and 7 are much superior thereover in various properties.

INDUSTRIAL APPLICABILITY

The laminated resin film of the present invention is excellent in adhesion between various layers thereof, suffers no corrosion or deterioration of the metal layer, has a sufficient weatherability when used for exterior use, is flexible enough to be affixed onto curved surfaces, and is excellent in solvent resistance, hot water resistance, chemical resistance and the like; it is useful as a marking film for vehicles such as cars, trams, and motor cycles, as a braids for cars and the like, as a marking film for signboards, outdoor advertisement tower and the like, and as an ornamental film for buildings, houses and the like.

What we claim is:

1. A laminated resin film having a metallic appearance, comprising:

(a) a polyvinyl chloride resin film having a total light transmission of at least 30% and a tensile strength at 5% elongation of not higher than 2 kg/cm;

(b) a thin polyurethane resin layer laminated on one surface of said resin film and having a total light transmission of at least 30% and a tensile strength at 100% elongation within the range of 50 to 550 kg/cm; and (c) a metal layer having a thickness of 50 to 2,000 Å formed and adhering onto said polyurethane resin layer.

2. The laminated resin film as claimed in claim 1, wherein said polyvinyl chloride resin film (a) has a total light transmission of no lower than 40%.

3. The laminated resin film as claimed in claim 1, wherein said polyvinyl chloride resin film (a) has a tensile strength at 5% elongation within the range of 1.9 to 0.2 kg/cm.

4. The laminated resin film as claimed in claim 1, wherein said polyvinyl chloride resin film (a) has a thickness within the range of 20 to 200 microns.

5. The laminated resin film as claimed in claim 1, wherein said polyurethane resin film (b) has a total light transmission of no lower than 40%.

6. The laminated resin film as claimed in claim 1, wherein said polyurethane resin film (b) has a tensile strength at 100% elongation within the range of 60 to 450 kg/cm$^2$.

7. The laminated resin film as claimed in claim 1, wherein said polyurethane resin film (b) has a thickness within the range of 0.5 to 100 microns.

8. The laminated resin film as claimed in claim 1, wherein said polyurethane resin film (b) is formed of a polyurethane resin having a glass transition temperature, Tg, of no lower than −60° C.

9. The laminated resin film as claimed in claim 1, wherein said polyurethane resin film (b) comprises a blend of:
a crosslinking grafted polyurethane resin, and
an amino resin crosslinking agent, said
crosslinking graft polyurethane resin being prepared by graft polymerizing a vinyl monomer mixture containing:
a hydroxy group-containing vinyl monomer, and
a carboxyl group-containing vinyl monomer, to a polyurethane resin, said polyurethane resin being prepared using as a polyol component an ethylenically unsaturated bond-containing polyester diol synthesized using a polycarboxylic acid having an ethylenically unsaturated bond as a part of a carboxylic acid component, and containing on average 0.2 to 3 ethylenically unsaturated bonds in the molecule and having a weight average molecular weight within the range of 300 to 200,000, said blend being heated and crosslinked.

10. The laminated resin film as claimed in claim 1, wherein said metal layer (c) is one formed by deposition or sputtering.

11. A marking film comprising the laminated resin film as claimed in claim 1.

12. The laminated resin film as claimed in claim 1, wherein said polyvinyl chloride resin film (a) has a total light transmission of no lower than 50%.

13. The laminated resin film as claimed in claim 1, wherein said polyvinyl chloride resin film (a) has a tensile strength at 5% elongation within the range of 1.8 to 0.4 kg/cm.

14. The laminated resin film as claimed in claim 1, wherein said polyvinyl chloride resin film (a) has a thickness within the range of 25 to 170 microns.

15. The laminated resin film as claimed in claim 1, wherein said polyvinyl chloride resin contains 0 to 30% by weight of a copolymerization component.

16. The laminated resin film as claimed in claim 1, wherein said polyurethane resin film (b) has a total light transmission of no lower than 50%.

17. The laminated resin film as claimed in claim 1, wherein said polyurethane resin film (b) has a tensile strength at 100% elongation within the range of 70 to 350 kg/cm$^2$.

18. The laminated resin film as claimed in claim 1, wherein said polyurethane resin film (b) has a thickness within the range of 1 to 30 microns.

19. The laminated resin film as claimed in claim 1, wherein said polyurethane resin film (b) is formed of a polyurethane resin having a glass transition temperature, Tg, of no lower than −50° C.

20. The laminated resin film as claimed in claim 1, wherein said polyvinyl chloride resin film (a) is a film composed of a semi-hard polyvinyl chloride resin composition.

21. The laminated resin film as claimed in claim 20, wherein said semi-hard polyvinyl chloride resin composition comprises:

(A) 100 parts by weight of a polyvinyl chloride which contains 0 to 20% weight of a copolymerization component;

(B) 1 to 20 parts by weight of a liquid polyester plasticizer having a number average molecular weight (Mn) of from 1,500 to 6,000, and 0 to 10 parts by weight of another plasticizer for polyvinyl chloride resins; and (C) 45 to 350 parts by weight of an ethylene/vinyl ester of a saturated carboxylic acid/carbon monoxide copolymer, based on total amount of said plasticizers (B), and has a stress at yield within the range of 1 to 6 kg/cm$^2$.

22. The laminated resin film as claimed in claim 21, wherein the liquid polyester plasticizer has a number average molecular weight (Mn) of 1,500 to 4,000.

23. The laminated resin film as claimed in claim 1, further comprising:
(d) an acrylic resin layer on said metal layer of said laminated resin film.

24. The laminated resin film as claimed in claim 23, wherein said acrylic resin layer (d) has a thickness within the range of 0.5 to 100 microns.

* * * * *